United States Patent [19]
Strickland

[11] 3,979,195
[45] Sept. 7, 1976

[54] GLASS FIBER ORIFICE PLATE

[75] Inventor: Edward T. Strickland, San Diego, Calif.

[73] Assignee: Kaiser Glass Fiber Corporation, Oakland, Calif.

[22] Filed: Jan. 8, 1975

[21] Appl. No.: 539,403

Related U.S. Application Data

[60] Division of Ser. No. 500,303, Aug. 26, 1974, Pat. No. 3,905,790, which is a continuation-in-part of Ser. No. 432,997, Jan. 14, 1974, abandoned.

[52] U.S. Cl.............................. 65/1; 76/107 S; 425/72 S
[51] Int. Cl.² ..................................... C03B 37/02
[58] Field of Search ............ 65/1; 76/107 S; 425/72

[56] References Cited
UNITED STATES PATENTS

| | | |
|---|---|---|
| 1,796,571 | 3/1931 | Mathieu .................................... 65/1 |
| 2,947,027 | 8/1960 | Slayter ................................. 65/1 X |
| 3,468,643 | 9/1969 | Stalego et al. ...................... 65/12 X |
| 3,573,014 | 3/1971 | Strickland et al. ......................... 65/1 |
| 3,574,581 | 4/1971 | Strickland et al. ......................... 65/1 |
| 3,771,982 | 11/1973 | Dobo ...................................... 65/1 |
| 3,836,346 | 9/1974 | Stalego .................................... 65/1 |

Primary Examiner—Robert L. Lindsay, Jr.

[57] ABSTRACT

A method and apparatus for forming glass fibers employing a generally flat orifice plate having closely spaced orifices is disclosed. A bulk flow of upwardly directed cooling gas which impinges on the orifice plate to eliminate stagnant gas pockets and which surrounds and cools the molten glass cones beneath each orifice is employed to maintain fiber separation and improve fiber formation and properties.

6 Claims, 6 Drawing Figures

GLASS FIBER ORIFICE PLATE

This a division of application Ser. No. 500,303, now U.S. Pat. No. 3,905,790, filed Aug. 26, 1974, which is a continuation-in-part of Ser. No. 432,997, filed Jan 14, 1974, abandoned.

BACKGROUND OF THE INVENTION

In recent years, there has been considerable interest in the production of glass fibers. Due to the tremendous usages of glass fibers, the interest has been particularly focused on increasing the production of individual fiber drawing stations. In the production of fibers, molten glass is typically passed through nozzles or orifices in a bushing to create individual fibers. In addition to the problem of increased production, the apparatus used in such processes is typically quite expensive as it often times involves the use of inordinate amounts of platinum, complex orifices, high pressure generating equipment, pressure resistant bushings, etc.

To increase the yield of the drawing stations, the obvious but difficult approach is to increase the number orifices per bushing through which the molten glass is directed and from which the individual fibers are formed. A few years ago, a standard bushing produced 204 fibers. After considerable expense and research, the capacity of the bushing has been increased to 2,000 orfices and, through a recent breakthrough in the art, arcuate bushings have been developed which are used in conjunction with high pressure glass and are capable of handling 6,000 orifices. While the total number of bushings per drawing station could, of course, be increased to raise the production of the station, such an approach would be self-limiting, increase the bulk of the station, complicate the operation as well as increase the costs and result in the decrease of uniformity of the individual fibers over the entire station. Therefore, it is the individual bushing orifice function and capacity which is a substantial limiting factor in the production of a high volume of quality fibers from a drawing station.

A single bushing 10-inch square, incorporated in the method and apparatus hereinafter to be described, can support 102,400 orifices. This represents 51.2 times the number of glass fibers which can be produced by the best of the current standard systems and 17 times more than the aforementioned arcuate bushing system are capable of producing. In spite of this tremendous gain, the present invention is remarkably simple both in concept and construction. It utilizes the simplest of bushings containing a minimum amount of platinum, the base of which is formed into a generally flat, thin horizontal orifice plate with just plain holes therein.

Plain holes in flat, wettable alloy plates have been utilized in the past, however, they have been quite limited with respect to the proximity of adjacent orifices. If the hole edges are closer than about one-half-inch apart, the glass will often times creep through capillary action along the underside of the plate to join and break an adjacent fiber. Such flow will continue in an ever-widening cycle resulting in a flooding of the entire bushing. The underside of the plate will become coated with a single, useless glob of glass. With non-wettable alloys, where the wetting angle is 55° or more, plain holes can, of course, be closer together, but the spacing nevertheless is limited to the diameter of the drops passing therethrough. Even with the best of non-wettable alloys, should two drops touch, they will immediately flow together to form a single larger drop and be forced to wet the plate. This wetting cycle will continue between the remaining orifices resulting in a totally unusable bushing.

There are other systems which employ plain holes in a flat bushing wherein a burnable gas is directed at the bushing and the forming cones. Upon contact with the high temperature of the issuing glass and of the bushing, the gas decomposes to deposit a carbon coating on the plate and glass. Due to the poor wetting characteristics of glass on carbon and graphite, the carbon which coats the glass drops allows the drops to be pushed together without coalescing. Despite the increased proximity within which the orifices may be placed in such a system, the overall production of the system is still quite limited due in part to the degrading effect of carbon on the glass. Moreover, such systems are unreliable because once flooding occurs, it is very difficult to effect separation thereafter. Other systems actually employ carbon inserts coaxially disposed around each orifice. Such systems occupy a greater amount of space and the carbon must be employed in an inert atmosphere. This, of course, further increases the cost of such a system and the inert gas along with the exposure of the carbon may have a damaging effect on the surface of glass fibers which desireably should be disposed in an oxidizing atmosphere. Such systems, therefore, do not present a satisfactory solution to the problem of increasing production.

U.S. Pat. No. 3,573,014 discloses a method and apparatus for producing fibers from glass which incorporates an arcuate bushing of the type referred to above. The system disclosed therein utilizes pressure on the glass substantially above a nominal pressure head to cause separation and prevent flooding of the bushing. To withstand such pressures, the bushing must have a pressure resistant configuration. This configuration is provided by the arcuate bushing. In such a system, separation is caused by what was originally termed the shower head effect wherein the molten glass is forced at high pressure through the apertures in the bushing and the formed jet overwhelms any thin film on the bushing and in fact sucks the surrounding area dry thereby preventing flooding and thereafter maintaining individual separated glass fibers. This high pressure, as well as requiring additional equipment for its generation, dictates the configuration of the bushing used in such a system which in turn limits the number of fibers which can be produced by such a system.

In providing an economical system with increased fiber production, in addition to developing a bushing with a greater number of orifices therein, it is necessary first to cause separation and thereafter to maintain the separation of each of the formed fibers. Glass has an unusually high surface tension and, therefore, a droplet is constrained to a generally spherical configuration. To distort the drop into a fiber forming cone requires the application of stress. As molten glass passes through an orifice and is forced to form into a fiber, the base of the fiber assumes the shape of a fiber forming, asymptote-like cone. As long as there is sufficient stress to maintain the geometry of the cone, i.e., to cause some concavity, an equilibrium between the fiber and its glass source will prevail. However, such fibers cannot be sustained without exercising considerable control over the asymptotic geometry of the feeding cone.

There are several means for cooling glass fibers. The standard means comprises one or two rows of orifices sandwiched between fins which in turn are cooled by liquid or air. Variations include several hundred individual streams of air, each one of which cools a single fiber base or row of fibers either through holes in fins or by air piped through hundreds of hypodermic needle-like tubes to direct air at or in between each fiber. Such fins are sometimes perforated to cause an overall oozing of air streams to impinge at or near the fiber roots. Such systems either cross the fibers at 90° with respect to their axis or blow in a downward direction. An example to the contrary is found in U.S. Pat. No. 3,695,858 which apparently incorporates a pair of air jets for each formed filament, i.e., 20 air jets for each 10 fibers. Each of the air jet orifices are located only a few thousandths of an inch from each fiber and are downwardly and upwardly directed at 45°. The pairs of jets work in unison ostensibly to cause a controlled turbulence to cool a row two tips wide within a hooded enclosure. In such systems, the physical positioning of the air orifices is extremely critical and necessarily complex.

Such systems have several problems which the hereinafter described system eliminates. Jets, fins and hoods must be located adjacent to both bushing and orifices which in turn requires very carefully positioning and position maintenance. They absorb considerable energy in cooling the bushing, occupy valuable space on the bushing and, therefore, substantially decrease the number of orifices which can be employed. In addition, these jets, fins and hoods become a receptacle for condensates from the molten glass which cause fiber breaking "flys" and which degrades the cooling efficiency and necessitates frequent cleaning. Finally, such systems have a most serious weakness in that they are limited to cooling but a few rows of orifices. When air blows across several rows of orifices at 45° or less, a primary and contiguous layer hugs the plate in a laminar flow and blankets the plate to prevent additionally directed air from penetrating the blanket to cool the cones. The air tends to laminate to create successive layers which quickly become too deep to have any cooling effect on the very short fiber forming cones. Consequently, the air at the cone level over cools the first rows of fiber and under cools the successive rows. For this reason, air directed from 90° to 45° to the fiber axis is quite limited in the width of its quenching effect.

To constrain the cone to its fiber forming shape by cooling is not difficult with a single fiber because of 360° cooling nor is cooling difficult with any number of rows of fibers one or two fibers wide. However, when there is a press of thousands of orifices tightly grouped together in a single flat bushing, a continuous and identical geometrical constraint on each of these thousands of cones presents a substantial cooling problem. Should just one of the thousands of forming cones lose its shape, the force of wetting would at once dominate and the glass would creep to an adjacent cone which would then break, the cycle of breakage and wetting continuing thereafter in an ever-widening ring until the bushing would become flooded. Therefore, in addition to providing an economical system for increased glass fiber production which incorporates a bushing having an increased number of orifices therein, it is necessary to provide a temperature control for the creation and maintenance of the asymptotic geometry of the fiber forming cones.

DESCRIPTION OF THE INVENTION

It is one object of this invention to provide an improved method and apparatus for producing fibers from a high temperature molten material.

It is another object of this invention to provide an improved method and apparatus for the production of glass fibers.

It is yet another object of this invention to provide an improved method and apparatus for increasing the production of glass fibers from a single station.

It is still another object of this invention to provide an improved method and apparatus for increasing the production of glass fibers from a single bushing.

It is a further object of this invention to provide an inexpensive and economical method and apparatus for the production of glass fibers.

It is yet a further object of this invention to provide an apparatus for the production of glass fibers which incorporates a bushing having a high density of orifices.

It is still a further object of this invention to provide a method and apparatus for the production of glass fibers having improved temperature balance across the bushing and fibers pultruded therethrough.

In accordance with one aspect of this invention there is provided a method of forming glass fibers which comprises:

a. passing separate streams of molten glass through a generally flat orifice plate having at least four rows of orifices therein, with orifices spaced in flooding relationship;

b. drawing fibers from cones of molten glass formed at each said orifice; and c. directing a bulk flow of rapidly moving gas upwardly to the orifice area in said plate:
  i. to cool said cones to provide a stable cone formation and to maintain separation of cones thus preventing flooding;
  ii. to impinge on said plate essentially to eliminate stagnant gas adjacent said plate and to cause gas to move outwardly along said plate in all directions from said orifice area, and
  iii. to supply a source of gas sucked downwardly by the fibers.

In accordance with another aspect of this invention there is provided an apparatus for manufacturing glass fiber filaments comprising:

a. means for containing a head of molten glass;

b. a generally flat orifice plate having at least four rows of orifices therein with orifices spaced in flooding relationship through which said glass fibers are formed, said plate being constructed of a heat resistant material and being disposed at the base of said containing means;

c. means for controlling the temperature of said plate;

d. means for withdrawing said fibers from said plate and forming cones at said orifices; and e. means disposed below said plate and being in communication with a gas supply for directing a bulk flow of rapidly moving gas upwardly to the orifice area in said plate:
  i. to cool molten glass cones disposed below the orifices to provide a stable cone formation and to maintain separation of cones thus preventing flooding;
  ii. to impinge on said plate essentially to eliminate stagnant gas adjacent said plate and to cause gas to move outwardly along said plate in all directions from said orifice area, and iii. to supply a source of gas sucked downwardly by the fibers.

Other aspects of this invention are described below.

The advantages to be achieved from the present invention are manifold. As a threshold matter, the orifice plate or bushing is simple to manufacture and employs less extremely expensive metal alloy than commercial bushings in use today. Compared to conventional practice employing orifices with tips, the radiant heat given off by the bushing employed in this invention is less and therefore the operator is subjected to less exposure to radiant heat. Inasmuch as there is less radiation, the present invention affords the possibility of employing less electrical energy. The above is particularly dramatic when comparing bushings of equal throughput.

Since high orifice densities may be realized, the present invention provides increased production per unit area of orifice plate. Moreover, there is more throughput per orifice than is realized in conventional practice employing tips, because of a skin effect pumping action due to the cones being cooled by air, the shorter orifice length and the higher exit temperature from the orifice. The fibers have good uniformity and do not require complex manufacturing apparatus. This invention does not require the use and complexity of fins, hood enclosures, expensive, non atmospheric gas mixed with carbon plating gases to create a non-wettable carbon barrier, arcuate pressure bushings, high pressure systems and does not require non-wettable alloys. In addition, it utilizes the simplest of cooling means. From a gas (e.g., air) source located below and relatively far from the orifices, a stable environment is forced upon thousands of fibers to maintain the stability of each of the formed fibers. With this system, thousands of orifices can be crowded into a single bushing which is very small in proportion to its yield yet has virtually no length and breadth limitation and wherein the hole edges can be as close as 0.001 of an inch. In contrast, the standard bushings have virtually reached their economic limit at 2000 orifices. A system free from such limitations greatly increases the yield and lowers production costs over the systems heretofore available.

This invention also provides considerable flexibility with regard to the number of fibers to be drawn from a bushing. The number of fibers required for final product application readily may be drawn from a single orifice area. Final products may require bushings producing strands having 1600, 2000, 3200, 4000, 20,000, or more fibers. The present invention has the potential of eliminating roving operations.

This invention further provides more flexibility in choosing windup speeds because commercially acceptable production rates (lbs. of glass) may be achieved employing more orifices and lower windup speeds which tend to reduce the risk of fiber breakage. Even at higher windup speeds, it has been found that "snap-out", wherein a large multitude of fibers break at essentially the same time, does not occur. Since the orifice plate is overwhelmed with high velocity upwardly moving gas, which moves outwardly along the orifice plate, no adjacent ambient gas (which may carry impurities that contaminate the fibers and cause fiber breaking) is drawn around the cones so that the environment around the cones is cleaner.

With a relative high density of fibers passing over the dressing fluid (binder) applicator roll, there is less loss, and therefore less consumption, of dressing fluid than experienced in conventional commercial processes. Interfiber scrubbing action appears to prevent excess pick up of dressing fluid by individual fibers so that later sling off of dressing fluid by the fibers is materially reduced. Reduced sling off of dressing fluid will result in a reduction of sizing in the air and both equipment and the work area will stay cleaner, thereby affording a better environment for the operator. Rapid quench of the glass also will reduce the content of glass volatiles in the surrounding environment, and the cooling gas which moves laterally outwardly from the bushing readily can be removed from the operating area to keep the operating area cooler.

Finally, this invention provides high quality glass fibers. Rapid glass quench (order of magnitude 100:1 compared to conventional type bushings), with a reduced loss of volatiles from the glass, results in a fiber more nearly corresponding to the composition of the glass in the molten bath. Moreover, the substantially greater cooling of the glass in the cones by conduction and convection, rather than cooling by radiation, provides a more tempered glass fiber.

This invention readily may utilize conventional glass furnaces, and conventional auxiliary equipment, such as bushing heaters, dressing fluid applicators and windup equipment. Existing glass fiber operations may be converted for the practice of this invention by modification of the bushing and provision of proper cooling gas means.

This invention easily may be practiced with the head of glass normally maintained in a conventional glass furnace, which generally is from about 8 to about 14 inches of molten glass. Indeed, the present invention can be practiced with a glass head of only about 1 inch or less. Although pressures in excess of those provided by a head of glass require expensive equipment that may be difficult to maintain, such pressures may be employed if desired. The temperature of the molten glass in the bath obviously will depend upon the type of glass being used. With type E glass, the temperature will be about 2100°F to about 2400°F (1150°–1315°C). The choice of the temperature for the molten glass bath in the glass furnace for any type of glass is routinely established in conventional practice and is easily within the skill of the art.

The orifice plate used in this invention may be made of any alloy acceptable for operation under glass fiber forming conditions. The alloy may be wettable or non-wettable. A standard platinum alloy of 80% platinum and 20% rhodium, or an alloy of 90% platinum and 10% rhodium, readily may be employed. Zirconia grain stabilized platinum alloys which have creep resistance may also be employed.

The surface of the orifice plate is generally flat. Plates which have small dimples or are in the form of gentle concave and/or convex configurations may be used without adversely affecting the practice of this invention. Heat warpage of a flat orifice plate may result in convex and/or concave areas within the plate but such distortions can readily be tolerated. If desired, the orifice plate may be reinforced with ribs or a honeycomb structure on the molten glass side of the bushing.

With commercial tips, the gas (e.g., air) cools the tips substantially below the bulk temperature of the bushing. As the tips cool, the glass flowing through the tips is also cooled and becomes more viscous and flows less readily so that the tips act as a thermal valve which decreases glass throughput. In the practice of this invention, the metal temperature adjacent the orifice during operation should not become substantially less than the bulk temperature of the orifice plate so that significant adverse thermal valve effects are avoided.

The thickness chosen for an orifice plate will be a function of bushing size, alloy strength, orifice size, orifice density, and the like. Generally the orifice plate need not be greater than 0.06 inches thick and orifice plates 0.04 inches thick have been successfully employed. The orifice area in the bushing readily may have a minimum dimension of at least about one-half inch with minimum dimensions of at least about 1 inch being quite feasible. Orifice areas of 10 inches × 10 inches are possible. In accordance with the conventional practice, the orifice plate or bushing is provided with heating means. Generally heating is accomplished by electrical resistance means.

The orifices in the orifice plate will generally be less than about 0.1 inch in diameter and may be as small as about 0.020 inches in diameter. The arrangement of holes is a matter of choice and orifices may be arranged in a square, hexagonal or any other desired arrangement. In order to obtain maximum utilization of bushing area the orifices generally will be spaced not more than about 2 diameters, center-to-center, with spacings of from about 1.25 to about 1.7 diameters, center-to-center, being preferred. With smaller orifices, the metal between adjacent orifices may be as little as 0.001 inch. It is apparent that the orifice spacing will depend in part on the thickness of the orifice plate alloy. If desired, periodic spaces having no orifices can be provided to add strength to the bushing. Care should be exercised, however, to avoid uneven air flow in the event such spacings are employed.

The orifice plates used in the practice of the present invention are at least four rows of orifices, preferably are at least about 10 or 11 rows of orifices, and most desirably are at least about 15 rows of orifices wide (i.e., in any direction). This invention permits the orifices to be spaced closely together with orifices in each row being spaced from orifices in its row and in adjacent rows in flooding relationship which, of course, is diametrically opposed to present practice. An orifice plate which would normally flood and would not maintain cone separation for practical production at operating glass pressure and temperatures can readily be employed in this invention since the bulk gas movement establishes and maintains cone separation. Even though an orifice plate may flood and foreclose sustained production under normal operating conditions of glass pressure and glass temperature just over the plate, such plate can be employed adopting the practice of this invention. In production, at least 90% production efficiency is generally desirable. Such rates and more can readily be attained by this invention.

Generally, for practical production, orifice density will be at least about 50 orifices per square inch, preferably at least about 100 orifices per square inch, and most desirably about 200 holes per square inch of the orifice area in the bushing. With very small orifices, the densities may range from about 500 to about 1000 orifices per square inch. The greater the density of a given orifice size, the greater the production that can be achieved per square inch per orifice area. Although orifice densities are given in orifices per square inch, it should be understood that the area occupied by the orifices may be less than 1 square inch.

Air is particularly preferred for this invention and can be at ambient temperature, or can be heated or cooled. Steam, finely dispersed water, other liquid droplets or the like can be added in the air if desired to increase its cooling capacity. Other gases such as nitrogen, carbon dioxide or the like may be employed in combination with air or instead of air. A non-reducing gas or gaseous fluid, i.e., one that does not provide a reducing atmosphere at the cones and orifice plate is generally preferred. While a reducing gas is not preferred, such gas (e.g., methane, ethane, or the like) may be employed if desired, but because of the essential requirement of this concept: a large cross section of rapidly moving gas to constrain the cones to their asymtotic-like configuration to prevent flooding, would require a great deal of expensive gases and not have any advantages over air. Since the gas is employed for cooling purposes it is preferred to employ gases of temperatures of about ambient temperature or less (e.g., about 100°F or less). It should be understood, however, that the benefits of this invention can also be achieved by warmer gas which may be, for example, even at 500°F, providing the volume of air is increased accordingly.

For ease of presentation the description herein is couched in terms of air. It is to be understood, however, that the description is equally applicable to other gases.

In one method of start-up of the method of this invention, albeit one having a slower start-up, the orifice plate temperature which is about 1000°C from the previous shutdown is elevated to about the range of devitrification temperature, between about 1083°C and 1105°C for E type glass. This will also cause a thin layer of glass inside and above the orifice plate to be raised to this temperature. The mass of glass inside the bushing which has been maintained at a temperature of about 1150°C to 1315°C is not affected. When the small quantity of glass adjacent the plate passes through the orifices, it will pass therethrough as separated streams without wetting and without flooding the plate even though the plate may be constructed of a wettable alloy. This cooler glass is no longer a pure Newtonian liquid but has some crystalline growth therein. While the resulting fibers are brittle, if handled carefully and slowly withdrawn, while increasing the plate temperature well above the devitrification range and while simultaneously adjusting the air cooling, the small amount of devitrified glass can be quickly and completely rinsed out, at which time the glass can be handled in the standard fashion.

In somewhat different operation to speed start up, the temperature of the glass adjacent the plate is increased by increasing the temperature of the orifice plate itself so that the glass therefrom becomes less viscous and under the pressure of the head of molten glass within the bushing quickly begins to pass through the orifices in the bushing or orifice plate. Due to the wetting properties of the glass and the close proximity of orifices, the underside of the plate begins to flood. As soon as the volume of flooded glass is heavy enough to furnish the initial attenuating force, it is necessary to reduce the flow of the glass through the orifices, otherwise, separation cannot occur. In one preferred embodiment of this invention, this flow rate regulation is accomplished through temperature control of the orifice plate. In yet another preferred embodiment, the current flow to the plate can be kept constant, and the glass flow through the plate reduced to allow separation to occur by directing a steady flow of air to the plate thereby reducing the plate temperature. Once separation is achieved, this air flow can be reduced to allow the plate to heat up and function as described above.

As the glass drops flow through the orifices and flood the underside of the orifice plate, it is necessary to reduce the temperature of the orifice plate into or at the edge of the glass devitrification temperature whereby the orifice plate functions as a molten glass thermic flow valve. This temperature reduction of about 50° to 150°C virtually stops the flow of glass through the orifice and allows for the flooding glass to flow or be drawn from the underside of the plates into individual glass fibers. If the glass is slowly withdrawn, separation will occur with the formation of a cone at each orifice with a fiber extending from each cone. An alternative to free flow is to contact the flooding drops with a glass rod or the like and slowly withdraw the rod from the plate. The heat of the molten glass causes the coalesced flooding drops to be welded to the rod and, therefore, the withdrawal of the rod causes the giant flooding drop or drops to form into individual fibers extending from the several orifices.

The early withdrawal rate should proceed generally at about one-half inch per second to avoid glass starvation of the forming fibers and to allow the surface glass to be slowly pulled into the enlarged main stream of attenuation without accidental pinch-off. Such a deliberate and slow rate of pull should continue until the underside of the plate is unflooded and separation is obtained.

A considerable drag will be experienced as the plate is being cleaned up by the glass tendency to adhere to the plate. The tensile strength and self-wetting energy of the glass is stronger than its plate wetting energy so that the dynamic glass will pull almost all of the static surface glass on the plate into its moving column and the plate will almost completely clean up leaving only a layer of glass about 0.001 inch thick. If pulling is carefully and slowly continued without interruption, a very fine fiber will extend from each hole in the orifice plate when there is no more surface glass available and when the glass which is being pulled through each of the orifices becomes the fibers final and sole source. At this point, it is again necessary to prevent fiber starvation and pinch-off by an increase in the glass flow rate through the orifices by a slight warming to the plate. As the warming of the thermic gate proceeds to permit a renewed but limited flow rate through the individual orifices, the glass fibers which extend therefrom can be wound around a very slowly rotation collet. The rotational speed of the collet and the temperature of the plate which controls the flow therethrough can be simultaneously and gradually increased while the air cooling (to be discussed) is coordinately reduced in pressure until a maximum drawing speed at a maximum temperature is reached.

In increasing the rate of production from the initial start up of the apparatus, at which time the fibers are withdrawn at about one-half inch per second to the desired attenuation rate, careful regulation and correlation of the temperature of the orifice plate, velocity of quench air, and the speed of withdrawal is accomplished. Since glass wets itself more readily than it does even a wettable orifice plate, as long as the forming cone under each orifice is maintained in an asymptotic configuration, the glass will continue to flow and is drawn through the orifices constrained in this manner to form into glass fibers as opposed to its tendency to run along the underside of the orifice plate and thereby flooding the plate. The molten glass passing through the orifice is continuously sucked into the fibers and cannot flood. In a simple implementation of this invention, a microscope with about 7 to 20 diameters of power can be placed near the underside of the orifice plate to view these cones while manually controlling the parameters. Continual viewing of the cones allows an operator carefully to correlate the temperature and rate of draw increases while controlling the air velocity visually to maintain the asymptotic configuration of the fiber forming cones. Of course, after considerable testing, such correlations should be computer actuated thereby saving considerable adjustment time and further increasing the production of the individual stations, however, an experienced operator can reach full attenuation speed as quickly as the plate temperature can stabilize, in about 30 seconds or less. Generally speaking, by properly maintaining the above described concavity of the forming cones, the attenuation rate can be increased to the limits of stress on the winding or other accumulating equipment. During operation, as glass passes through an orifice, a stress is provided by the forces of attenuation which are resisted by the viscosity drag of the glass through the cone, the base of which is fastened to the rim of the orifice by surface tension, the wetting energy of the glass and the partial vacuum inside the cone. Through this dynamic sucking stress, more glass is pulled through the orifice than would flow by gravity alone and there is a continuous flow of glass toward the filament and flooding is avoided.

As hereinafter noted, to maintain this asymptotic geometry of the fiber forming cones and therefore maintain separation of the individually formed fibers, it is necessary to cool substantially identically each of the fibers and the fiber forming cones as well as maintain the proper correlation between the rate of withdrawal, the temperature of the orifice plate and the flow rate through the individual orifices. In order uniformly to cool each of the individual fibers and cones, an air source is disposed below the orifice plate. The distance of the source from the plate depends upon the area of the orifices, size of the air nozzle or nozzles and the like. The distance is generally between 1 and 20 inches and with the particular size nozzle described below is between 2 and 4 inches. Preferably the upwardly moving air is introduced at a distance of from about 2 to about 12 inches from the bushing. With larger orifice areas the source of upwardly moving air will often be at least about 4 inches from the plate so that the air stream readily can impact on the entire orifice area.

The upwardly quenching air flow moves in between the individual fibers to each of the hundreds or thousands of cones. While it may appear that a tremendous number of fibers emanating from the orifices would prevent air travel therethrough, there may be, however, paradoxically over 40,000 times more air cross section than glass cross section which is considerably more open space than occupied space. For example, on a 3 × 10 inch bushing using a C filament whose cross-sectional area is $2.54 \times 10^{-8}$ square inches, 30,000 orifices (0.020 in. dia. on 0.032 in center) can be drilled. This represents $7.6 \times 10^{-4}$ square inches for the entire 30,000 fibers, which move through 30 square inches of open space to leave a vast unopposed openness for the air to move upwardly through the fibers to the forming cones. Despite the small area occupied by the fibers, the fast moving filaments will entrain the air and begin to function as an air pump. Within the first fractions of an inch from the orifices, however, the skin drag of the fibers is unable to accelerate the skidding air vortices thereby to a speed at which this entrainment pump becomes effective. But as the fibers are brought closer together and the air skids faster and faster along the fiber boundary layers, this pumping effect rapidly increases. Ordinarily, fill-in quenching air is sucked immediately across the plate and into the first few inches of fiber strands wherein the glass fiber pump becomes more effective closer to the plate. Accordingly, it appears as though this pumping action which begins at once would make it quite difficult to quench the fiber forming cones. However, as soon as air is directed upwardly between the fibers, this sucked in air is stopped and cooling air therefore is able to pass virtually unopposed upwardly between the fibers through generally quiescent air to the orifice plates. There is nevertheless sufficient downward skidding of air in the immediate vicinity of the fiber boundary layers between the bushing and the air nozzle to cause the rapid upwardly moving air to invert and flow inwardly and downwardly in the direction of the high speed moving fibers. This air increases in speed as it assumes an umbrella-like shape in the cone area whose analogous handle is a rapidly descending trumpet-shaped tube of air which cascades 360° around the fiber forming cone, cooling the cone from its plate secured base to the extended fiber apex. When the ascending turbulent air reaches the interstices between the orifices, it splits to form a hexagonal star, the moving points of which flow toward the area between the fibers while the remainder is perfectly proportioned, providing even 360° cooling of the fiber forming cones. As this cool air turns downwardly, hugging the convex shape of the cone as well as hugging and skidding the full fiber length, it accelerates to a very high speed as it follows the filament into the high pumping zone. A continuous mixing of cool ascending air with hot turbulent air in the vortices caused by the skin effect surrounding the descending fibers provides a uniform and stable environment over the entire length of the formed fiber. Through such cooling, the asymptotic geometry of hundreds or thousands of fiber forming cones can be continually maintained thereby allowing for a large increase in fiber production from a relatively very small orifice plate.

The upwardly directed air, in addition to cooling the surface of the cones and providing air to be drawn down the fibers, also serves to prevent pockets of stagnant air on the underside of the bushing which can result in local hot spots and cause flooding. The upwardly directed bulk air movement impinges on the underside of the bushings and tests indicate that a portion of that air moves laterally outwardly in all directions from the orifice area. The macro-cooling with the upwardly moving bulk air establishes and maintains cone and fiber separation.

Diametrically opposed to a conventional bushing with tips, it has been determined that, at a constant windup speed and constant plate temperature, more cooling by the air will provide a larger diameter fiber. Apparently the skin cooling in the cone creates a pumping action as the fiber is drawn from the cone. In this regard it should be noted that cooling occurs by extremely rapid conduction so that the skin of the fiber-forming cone is cooler than the interior. In conventional practice with fins, cooling is largely by radiation so that the interior of the transparent cone tends to be at more nearly the same temperature as the skin.

In proper operation the cone lengths are stable to the eye and the visual length of the cone is very short, generally not more than about 2½ times the orifice diameter and, in any event, generally not longer than about one-eighth inch. In preferred operation the cone length is not more than about 1½ times the orifice diameter. Many times, the pumping action caused by the cooled skin of the cone results in the base of the cone receding part way up the side of the orifice in the bushing. The glass temperature at the tip of the cone will be approximately the annealing temperature of the glass, and generally will be from about 1400°F (760°C) to about 1700°F (927°C).

The angle of air flow will vary somewhat depending on the number of rows and the density of orifices. Generally, process control is best maintained by positioning the air as vertical as possible consistent with the needs to draw fibers. While with extremely close control, the air may be directed upwardly at an angle of about 40° from horizontal, tests with a 17 row orifice plate and a 10 row orifice plate have indicated that for realistic control in commercial operation, the angle of the air should be at least about 45° or 46° from the horizontal, but preferably at least about 60° from the horizontal. With only a few rows the angles may be somewhat less critical. Air angles of from about 70° to about 85° are particularly preferred. The term horizontal is employed here to mean the plane in which the orifice plate generally lies.

Any mechanical arrangement that provides a bulk flow of air (i.e., a generally single upwardly moving air column that impinges at the cone and plate area) that impinges on the orifice plate is satisfactory for this invention. Multiple nozzles or a nozzle with a slit can be employed. Deflector plates which deflect air to an upward path can also be employed. While introduction of the upwardly moving air from one side of the orifice plate is entirely satisfactory and is preferred, the air can, if desired, be introduced from two or more sides of the bushing. The cross-sectional size of the air stream at the orifice plate should be at least as large as the orifice area in the orifice plate. The fibers can be pulled somewhat off to one side to accommodate the mechanical arrangement for introducing the air. The same benefit can be obtained by pulling the fibers vertically and tilting the bushing slightly.

The air pressures to be employed may readily be determined by the routineer and may vary from 2 inches of water to 5 psig or 10 psig or more depending on nozzle size, nozzle location and the like. Pressures from about 1 to about 5 psig are generally preferred, particularly for bushing of 10 rows or more. Generally the linear velocity of the air leaving the nozzle will be at least about 100 feet per second and preferably at least about 200 feet per second. Air velocities on the order of 400 feet per second and higher are readily employed in this invention. The velocity or pressure chosen, as noted above, will depend, in part, on the particular arrangement chosen. In any event the air flow should be sufficient to cool the cones and provide stable separated cones, to impinge on the plate essentially to eliminate stagnant air adjacent the plate and to provide a source of gas sucked downwardly by the fibers. It is apparent that cooling should not be so pronounced that fiber production is materially adversely affected.

While the above represents the preferred embodiment of cone stabilization, another method of in-mass cooling is provided by a series of thin curtains of cool air which sweeps across orifice plate in rapid succession. These curtains should be aimed at an angle of 46° to 90° to the plate surface to sweep in a broom-like fashion removing the hot stagnant air from the plate. By controlling the rate and frequency of the sweep and the velocity of the air, an average ideal temperature can be maintained across the fibers and fiber forming cones. These curtains of quenching air can be created by an air nozzle having one or more orifice slits therein, which nozzle is continually rotated 90° to the fiber axis to provide the described broom effect of these curtains of air.

Other variations in cooling such as the utilization of a staccato series of controlled annular vortices moving onto and generally normal to the face of the bushing can also be incorporated. The slow moving donuts of air with high internal angular momentum would continuously exchange the heated air from the plate, sweeping it into its annular vortex to scrub the plate surface while growing in size continuously to replace stagnant hot air. If these annular vortices of air are repeated at rapid intervals, the effect is to maintain an average desirable temperature over the length of formed fibers including the vital forming cones. Similarly, spiraling air currents could be employed whose vortices rotate generally in a plane with the plate similar to that produced by a fan blade. These spiraling cool vortices act to sweep away the hotter stagnant air remaining on the surface of the bushing. In each of these systems, the air is directed substantially parallel and in an opposite direction to the motion of the fibers so that the air is able to pass generally unopposed between the fibers and to utilize a substantial pumping effect created by the formed fibers. Early pumping created by the rapidly moving fibers is easily overwhelmed and through the vast open spaces cool air reaches each of the forming cones rigidly to maintain its required configuration.

The close orifice spacing and the stability of the cones can result in self-correction of localized flooding, should such flooding occur during operation. If a fiber breaks and the orifice floods to an adjacent fiber, that fiber will exert an increasing amount of attenuating force on the flooded glass to reinstitute cone and fiber formation from the flooded orifice. If necessary, localized cooling air as known in the art, for example, from a hand air lance may be applied to the multiple coalesced fibers to correct the flooding and reinstitute normal operation.

A slight instability may appear in the cones along the periphery of the orifice area. This occurs because the plate and glass are cooler due to heat losses to the exposed edges of the bushing. Stability can be improved providing the peripheral orifices are made slightly larger (for example, from about 0.001 to about 0.003 inches in diameter larger) than the interior orifices. Such adjustment will provide a mere stable operation without materially affecting uniformity of fiber size. Since the volume of glass, not just its skin, flowing through the peripheral orifices is cooler, glass will flow through the orifice less readily so that use of a slightly larger orifice will compensate for the reduced ability of the glass to flow.

In order to insure that molten glass from an orifice will controllably flood if the fiber breaks, one embodiment of this invention contemplates the provision of capillary grooves between orifices. These capillary grooves will cause the plate to act as though it had a controlled but perfect wettability. Since only a small volume of glass from the oozing orifice will first contact a neighbor fiber, the increase of acceleration load will be gradual, as the whole fiber pulls more glass out of the groove its own cross section enlarges and becomes stronger until a single larger fiber is fed by two orifices. It is described elsewhere how to separate such single fibers into two fibers. In this embodiment, each orifice is joined to at least two adjacent orifices so that if a fiber breaks, controlled flowing of the glass to the adjacent orifice is virtually assured. The grooves may be as wide as the orifices but preferably about one-third of the diameter of the orifice and may have a depth of around one-half the thickness of the bushing plate. Since the outer orifices may tend to flood more often than interior orifices, only outer orifices may be provided with grooves. Viewed in the context of start-up and self-correction of flooding, a bushing made of a highly wettable alloy, which more easily floods, is preferable to a bushing made of a so-called non-wettable alloy. All alloys, of course, will flood if the temperature of the glass is sufficiently high to cause the glass to be quite fluid.

The cooled fibers are coated with a dressing fluid or sizing by contacting the fibers with an applicator roll or the like, and the fibers then may be wound up on a package. The drawing or windup speeds of the fibers may vary widely from, for example, of about 100 ft. per minute up to about 13,000 ft. per minute or more. Determination of wind-up speeds or attenuation force for any given set of conditions is within the skill of the art. Windup speeds of over about 5,000 feet per minute are employed in conventional processes and may readily be employed here. Low draw off speeds may permit matching of fiber production with the rate of fiber usage in the manufacture of a final product so that the fiber or strand could be employed directly in the final production. In view of the orifice density such procedures would still be within the range of practical production. Dressing fluids, dressing fluid applicators and windup apparatus are conventional in the art and will not further be described here.

Good quality glass fibers are manufactured by the method of this invention. As a threshold matter, the extremely rapid quench of the molten glass below the orifices results in less loss of volatiles from the glass so that the glass composition of the fiber will closely conform to the glass composition in the glass bath. Moreover, this invention permits the production of tempered fibers. With a super quench due to the upwardly flowing air, the surface is cooled more rapidly than the interior glass and the temperature gradient is greater above the annealing temperature than below. As a result, the surface of the final fiber is under compression. In a conventional process employing long tips quite the reverse occurs. The temperature gradient is greater below the annealing temperature than above. In conventional processes, snap-out sometimes occurs wherein the fibers at temperatures below the annealing temperature all break substantially at the same time. Snap-out has been attributed to circumferential and length-wise temporary tensional forces. As noted earlier, snap-out has not been observed in the method of this invention, and logically so.

While a conventional glass furnace and auxiliary equipment readily can be employed in the practice of this invention, a particular apparatus wherein the head of glass can be maintained independent of the level of the glass bath is shown in the attached drawings.

Figure 1:
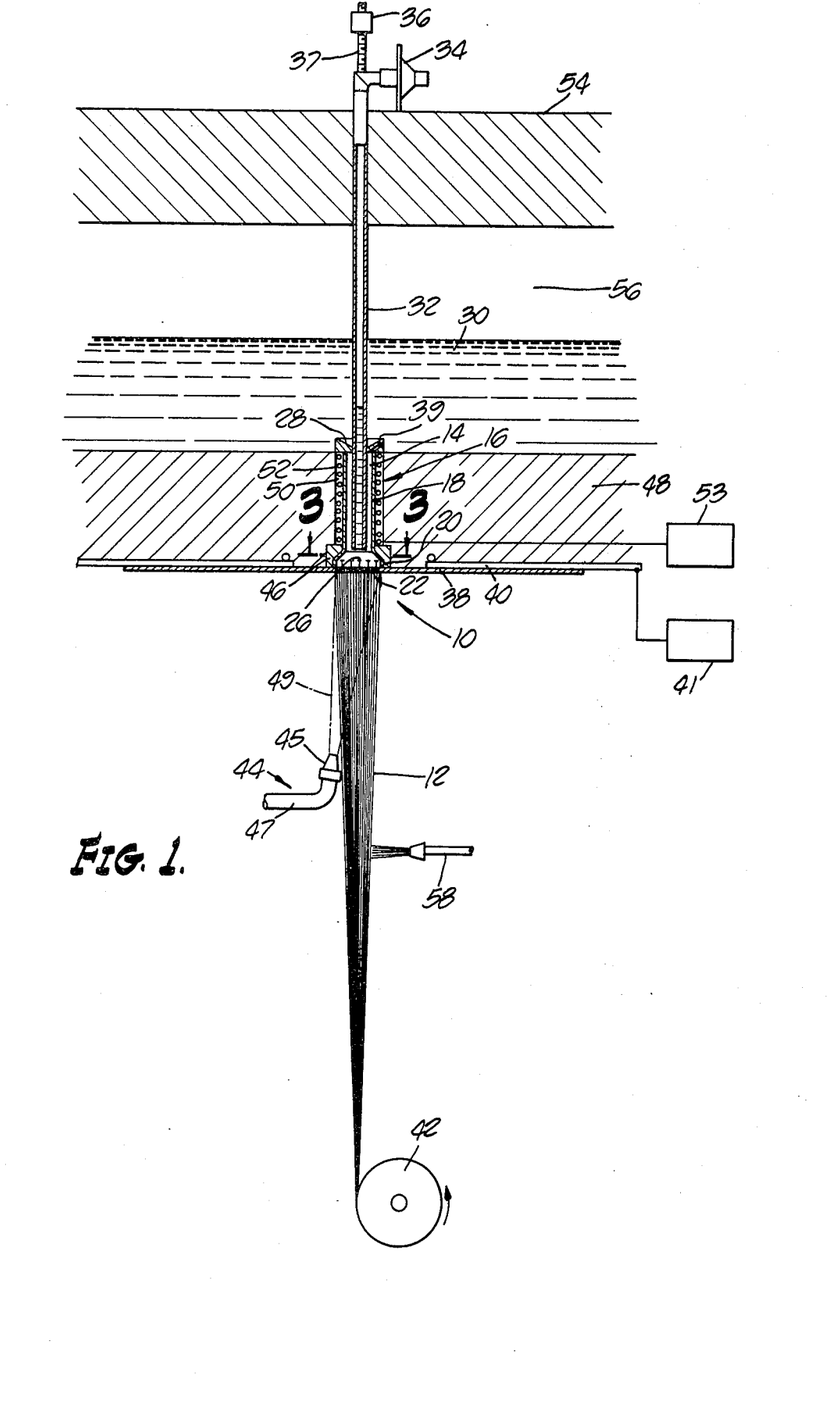
FIG. 1 is a schematic view of the glass fiber filament production equipment.

Referring now in detail to the drawings, an apparatus 10 for producing glass fibers 12 is illustrated in FIG. 1. As shown therein, a head of molten glass 14 is maintained within a bushing 16. The bushing is comprised of a tubular reservoir portion 18 which can be square, rectangular or cylindrical in shape and an enlarged base portion 20 which terminates at the lower end thereof in a flat orifice plate 22. The orifice plate has a plurality of tightly spaced plain holes 24 therein. As an example, in a 2,000 hole orifice plate 2.7 inches square, the holes or orifices are 0.04 inches in diameter and spaced 0.06 inches from center line to center line. Typically, the lengths of the holes in the orifice plate vary from 0.03 inches to 0.06 inches and T-shaped reinforcing bars 26 or, alternatively, a honeycomb structure (not shown) may be provided on the orifice plate to add strength thereto and to prevent plate sag. It is also entirely feasible to employ a generally flat orifice plate without any reinforcing.

A valve 28 which communicates the interior of the bushing with a liquid glass supply 30 can be disposed atop bushing 16 to permit a change in fiber diameter, with high heads tending to provide somewhat larger filaments. By opening and closing valve 28, glass is allowed to flow from the supply 30 into the reservoir portion of the bushing 16 thereby maintaining the desired head of the glass within the bushing. Of course, the fiber withdrawal rate, cooling air and plate temperature also are adjusted to obtain a stable fiber. To facilitate the regulation of the glass head within the bushing, an elongated platinum tube 32 extends upwardly from the interior of the bushing, through valve 28 to a sonic depth indicator 34. The sonic depth indicator is coupled with a valve regulator 36 which reacts to signals therefrom to move the valve 28 upwardly or downwardly on the bushing thereby opening and closing the valve and allowing the liquid glass to pass thereby.

In the embodiment illustrated in FIG. 1, the valve 28 is in threaded contact with regulator 36 by means of a threaded bar 37. Rotating the bar 37 causes the valve to move vertically with respect to valve seat 39 thereby regulating the flow of glass into the bushing 16. In this manner, a desired head of glass is continually maintained within the bushing as the glass fibers are drawn through the orifices 24 in the orifice plate 22.

The majority of applications will require no head control, therefore an envelope geometry of a bushing may be employed that is a duplicate of a conventional configuration, one that can exactly fit into a standard forehearth position. Because this geometry is well known in the art, further description is redundant.

As shown in FIG. 1, a platinum bus bar 38 communicates with an electrical source of about 3 volts and 1,000 amps with the orifice plate whereby the temperature of the plate can be increased. A water-cooled copper bus bar 40 is provided on the platinum bus bar 38 to make the electrical contact between the platinum bus bar 38 and the electrical source and reduce the necessary length of the platinum bus bar thereby reducing costs. The copper bus bar 40 is water cooled to reduce the temperature at the point of contact between the two bus bars and thereby preserve the copper and is spaced a minimum distance of about 1.5 inches from the orifice plate 22 so as to have a minimal effect on the temperature of the plate while limiting the length of the platinum bus bar. It can be seen that by controlling the electrical flow through a regulator, the temperature of the orifice plate can be carefully regulated. As an alternative to the above described plate heating method, it should be noted that the temperature of the orifice plate can also be controlled through induction heating without the need for the aforesaid bus bars. In general, orifice plate temperatures will range from about 2050°F (1120°C) to about 2300°F (1260°C) during operation.

Upwardly directed air 49 flows through nozzle 45 disposed on the end of supply hose 47, through connection 44. A row of nozzles can, of course, be employed to provide a substantially single column of air that impinges on the orifice plate and cools the cones to maintain them in a stable configuration. The attenuation of the fibers is effected by rotating drum 42.

Figure 2:
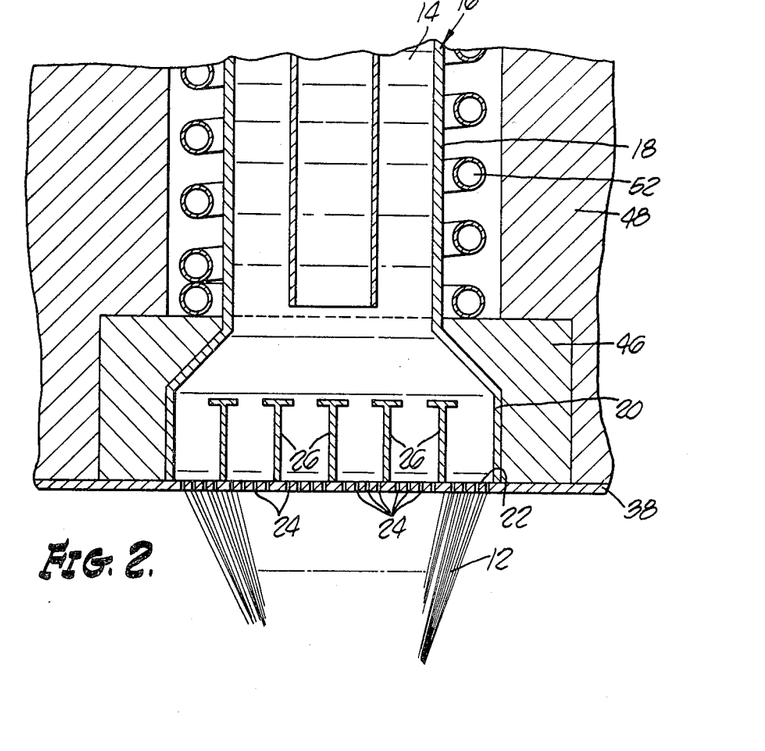
FIG. 2 is an enlarged sectional view of the bushing and orifice plate illustrated in FIG. 1.
Figure 3:
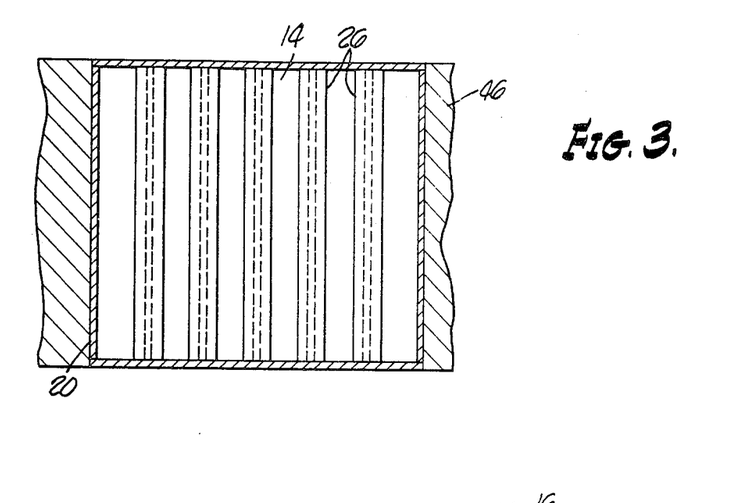
FIG. 3 is an enlarged sectional view taken along Line 3—3 of FIG. 1 showing the bushing and orifice plate.

In addition to the aforementioned temperature regulation controls of the orifice plate, fibers and cones, additional insulation and heating is provided to prevent temperature loss from the system which would necessarily effect the viscosity of the molten glass and consequently, the forming of the glass fibers. As shown in FIGS. 1 and 2, the base portion of the bushing is surrounded by a ceramic support 46 which, in addition to providing support for the bushing, further insulates the exterior position thereof which is adjacent the orifice plate. The ceramic support 46 and tubular reservoir portion 18 of of the bushing are surrounded by a layer of insulation material 48 which additionally extends between the platinum copper bus bars and the supply of liquid glass. The insulation material 48 terminates short of the walls of the bushing to provide an annular area 50 about the reservoir portion of the bushing in which a heating coil 52 is disposed to provide compensation for heat loss due to conduction through the insulation. The heating coil is connected to a thermocouple 53 to control the current therethrough and thereby regulate the compensating heat generated thereby. A second layer of insulation material 54 is disposed over and spaced from the liquid glass supply 30 thereby providing an insulation gap 56; as shown in FIG. 1. Of course, the above represents merely an exemplary embodiment of an insulation and supplementary heating configurations and other varying configurations could be employed to adequately maintain the desired temperatures. For example, to compensate for heat loss from the bushing due to conduction, resistance heating could be employed using the bushing as an element of an isolated circuit. In such an embodiment, a 400 cycle generator has been found to be an excellent power source.

Lastly, as shown in FIG. 1, a sizer 58 is provided to size the individual fibers with a standard lubricant type material such as starch to reduce abrasion between adjacent fibers and to assist resin wetting for future laminating. A roll sizer may also be employed to reduce consumption of sizing.

Figure 4:
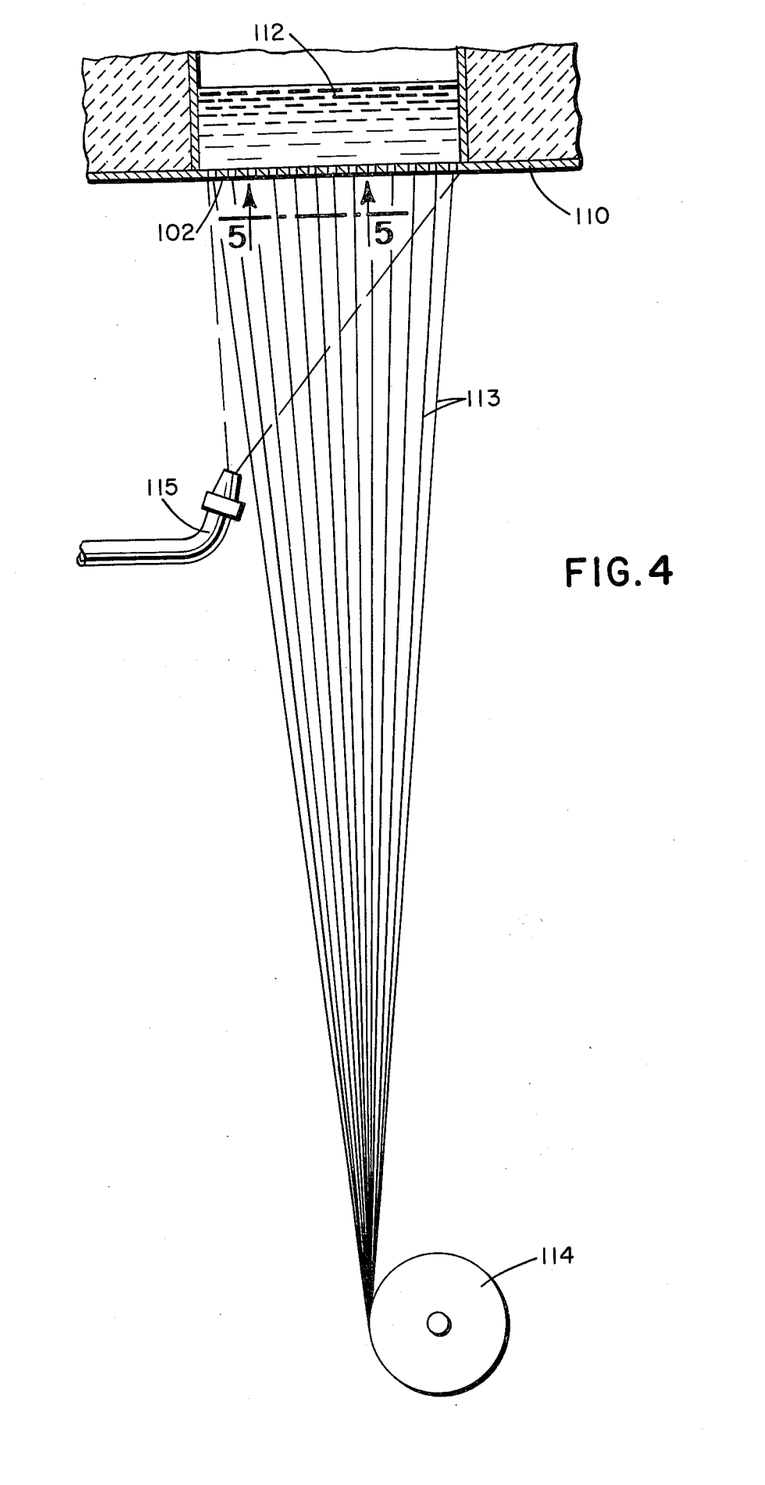
FIG. 4 is a schematic view of glass fiber production equipment.

In FIG. 4, bushing 110 positioned in a glass furnace and surrounded by ceramic insulating material 111, contains a bath of molten glass 112. Glass fibers 113 are drawn by collet 114 from the orifices 102 in bushing 110. Cooling air is introduced through nozzle 115. The orifice area in bushing 110 contains capillary grooves in the underside of the plate connecting adjacent orifices which can be better seen in FIGS. 5 and 6.

Figure 5:
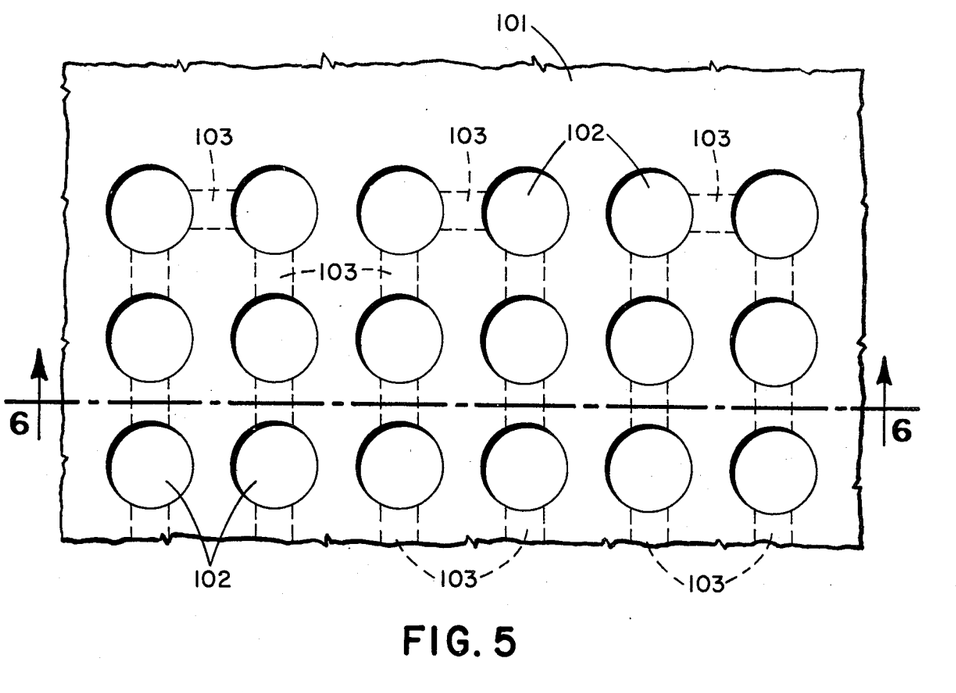
FIG. 5 is a view taken along line 5—5 of FIG. 4 looking upwardly at the lower surface of an orifice plate in which the orifices are connected by capillaries.
Figure 6:
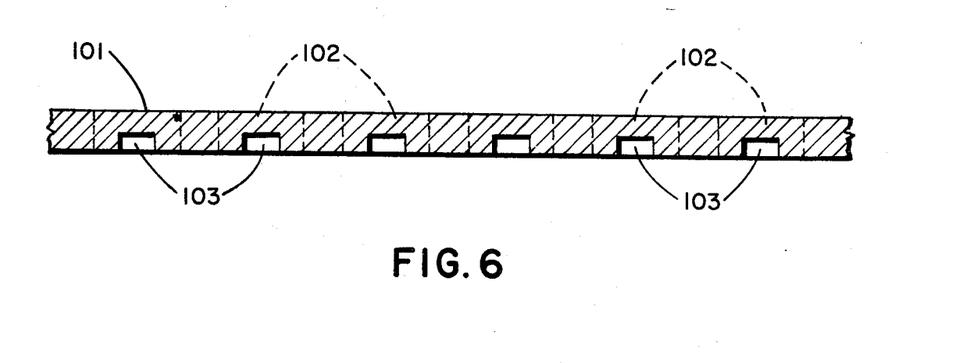
FIG. 6 is an enlarged sectional view taken along line 6—6 of FIG. 5 showing an orifice and capillary.

As shown in FIG. 5, orifices 102 of orifice plate 101 are connected by capillaries 102. An elevational sectional view taken along line 6—6 is shown in FIG. 5. In FIG. 5, capillary 103 in the underside of orifice plate 101 connects adjacent orifices 102.

The following examples are included for illustrative purposes only and are not intended to limit the scope of the invention.

EXAMPLE I

A conventional tipless bushing was employed in this example made from a 0.040 inch thick platinum allow (80% platinum — 20% rhodium) flat sheet. Orifices 0.052 inches in diameter were drilled in the flat plate in a hexagonal pattern on 0.070 in. centers. The rectangular orifice area in the bushing was approximately 1.25 in. wide and approximately 2.85 in. long with alternating 17 and 18 orifice rows. Each row contained about 46 orifices.

Type E glass was melted in a conventional glass furnace to provide about a 10 in. deep glass bath having a temperature of approximately 2300°F and glass fibers were manufactured employing the above plate. The plate was equipped with a heater and maintained a temperature of about 2100°F. A standard sizing was applied by a roll to the fibers which were wound at a speed of about 3,000 ft. per minute.

In order to maintain fiber separation, air was directed upwardly from the long side of the orifice area at an angle of approximately 15° from vertical through six ¼-in. diameter nozzles arranged in a row on one side of the orifice area about 5 inches below the orifice plate. Air pressure within the range of 3–5 psig was employed.

Fibers were successfully drawn in stable operation and filament separation was maintained.

During usage the orifice plate exhibited some warpage and developed both concave and convex areas. The warpage of the orifice plate did not hamper fiber manufacture.

EXAMPLE II

In order to illustrate the benefits of this invention, the performance of the orifice of Example I is compared to the performance of two conventional tip bushings, (designated A and B) employing fin coolers. The overall bushing face areas were the same in each case but the orifice section of the bushing of Example I covered less than one-fourth of the entire face of the bushing. In each case Type E glass was used.

|  | Bushing | | |
|---|---|---|---|
|  | Ex. I | A | B |
| No. Holes | 804 | 390 | 390 |
| Hole Dia (in.) | .052 | .078 | .090 |
| Throughput (lb/hr) | 65.0 | 39.0 | 51.6 |

-continued

|  | Bushing | | |
|---|---|---|---|
|  | Ex. I | A | B |
| Area of Each Hole (in² × 10⁻⁴) | 21.23 | 47.78 | 63.62 |
| Hole Area Ratio | 1 | 2.25 | 3 |
| Orifice Plate Area (in²) | 3.56 | 15.62 | 15.62 |
| Throughput (lb/in²/hr) | 18.3 | 2.5 | 3.3 |
| Holes per inch² of Bushing | 226 | 25 | 25 |

The above demonstrates that this invention provides more throughput per unit of bushing area in the bushing as compared to conventional practice. This invention also provides more throughput per hole area as compared to conventional practice. More clearly to envision the magnitude of difference, if an equal size of orifice section were used, Example I bushing would have produced 3527 fibers with a throughput of 285 pounds per hour.

Changes and modifications may be made in carrying out the present invention without departing from the spirit and scope thereof. Insofar as these changes and modifications are within the purview of the appended claims, they are to be considered as part of the invention.

EXAMPLE III

The bushing employed in this example was made from a 0.060 inch thick platinum alloy (80% platinum – 20% rhodium) flat sheet. One thousand six hundred and seventy orifices were drilled in the flat plate in a hexagonal pattern on 0.070 inch centers. The rectangular orifice area in the bushing was approximately 1⅛ inch wide and approximately 6½ inches long. The peripheral orifices were 0.049 inches in diameter and the remaining orifices were 0.047 inches in diameter.

Type E glass was melted in a conventional glass furnace to provide about a 10 inch deep glass bath having a temperature of approximately 2300°F and glass fibers were manufactured employing the above plate. The plate was equipped with a heater and maintained a temperature of about 2240°F. A standard sizing was applied by a roll to the fibers which were wound at a speed of about 2,500 feet per minute.

In order to maintain fiber separation, air was directed upwardly from the long side of the orifice area at an angle of approximately 20° from vertical through 12 ¼-inch diameter nozzles arranged in a row on one side of the orifice area about 5 inches below the orifice plate. Air pressure within the range of 3–5 psig was employed.

Fibers were successfully drawn in stable operation and filament separation was maintained. The peripheral cones were quite stable.

I claim:

1. An orifice plate for forming glass fiber filaments including a generally flat orifice area having a plurality of orifices therein, each said orifice being adapted for the formation of a fiber-forming cone of molten glass, and capillary grooves in the underside of said orifice plate connecting adjacent orifices, whereby controlled flooding occurs between adjacent orifices connected by a capillary when a fiber drawn from one of said orifices breaks.

2. The orifice plate of clam 1 wherein each orifice is connected by grooves to at least two adjacent orifices.

3. The orifice plate of claim 1 wherein only the orifices near the perephery of the orifice area are connected by grooves.

4. The orifice plate of claim 1 wherein the orifice density is at least about 50 orifices per square inch.

5. The orifice plate of claim 1 wherein the orifice density is at least about 100 orifices per square inch.

6. The orifice plate of claim 1 wherein the orifice density is at least about 200 orifices per square inch.

* * * * *